(12) United States Patent
Karabinis

(10) Patent No.: US 8,923,850 B2
(45) Date of Patent: Dec. 30, 2014

(54) SYSTEMS AND METHODS FOR CONTROLLING BASE STATION SECTORS TO REDUCE POTENTIAL INTERFERENCE WITH LOW ELEVATION SATELLITES

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 2293 days.

(21) Appl. No.: 11/682,683

(22) Filed: Mar. 6, 2007

(65) Prior Publication Data

US 2007/0243866 A1    Oct. 18, 2007

Related U.S. Application Data

(60) Provisional application No. 60/744,777, filed on Apr. 13, 2006.

(51) Int. Cl.
*H04W 4/00* (2009.01)
*H04B 7/185* (2006.01)

(52) U.S. Cl.
CPC ........ *H04B 7/18513* (2013.01); *H04B 7/18563* (2013.01)
USPC .......................................... 455/430; 455/427

(58) Field of Classification Search
None
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,327,572 A | 7/1994 | Freeburg |
| 5,339,330 A | 8/1994 | Mallinckrodt |
| 5,365,571 A | 11/1994 | Rha et al. |
| 5,394,561 A | 2/1995 | Freeburg |
| 5,432,780 A | 7/1995 | Smith et al. |
| 5,446,756 A | 8/1995 | Mallinckrodt |
| 5,448,623 A | 9/1995 | Wiedeman et al. |
| 5,485,631 A | 1/1996 | Bruckert |

(Continued)

FOREIGN PATENT DOCUMENTS

| | | |
|---|---|---|
| EP | 0 506 255 A2 | 9/1992 |
| EP | 0 597 225 A1 | 5/1994 |

(Continued)

OTHER PUBLICATIONS

Notification of Transmittal of the International Search Report and the Written Opinion of the International Searching Authority, or the Declaration, International Search Report and Written Opinion of the International Searching Authority, PCT/US2007/006969, Feb. 25, 2008.

(Continued)

*Primary Examiner* — Yuwen Pan
*Assistant Examiner* — Ayodeji Ayotunde
(74) *Attorney, Agent, or Firm* — Myers Bigel Sibley & Sajovec, P.A.

(57) ABSTRACT

Interference between satellite radioterminal communications systems may be reduced by transmitting and receiving satellite uplink frequencies in a Time Division Duplex (TDD) mode by a wireless base station in a first sector thereof, while simultaneously refraining from transmitting and receiving satellite uplink frequencies in the TDD mode by the wireless base station in a second sector thereof that points to a low elevation angle satellite. Satellite uplink frequencies may be transmitted and received in the TDD mode by a satellite that communicates with radioterminals in the second sector.

14 Claims, 8 Drawing Sheets

(56) References Cited

U.S. PATENT DOCUMENTS

| | | | |
|---|---|---|---|
| 5,511,233 | A | 4/1996 | Otten |
| 5,555,257 | A | 9/1996 | Dent |
| 5,584,046 | A * | 12/1996 | Martinez et al. ............. 455/13.1 |
| 5,598,404 | A * | 1/1997 | Hayashi et al. ............... 370/342 |
| 5,612,703 | A | 3/1997 | Mallinckrodt |
| 5,619,525 | A | 4/1997 | Wiedeman et al. |
| 5,631,898 | A | 5/1997 | Dent |
| 5,734,983 | A | 3/1998 | Faruque |
| 5,761,605 | A | 6/1998 | Tawil et al. |
| 5,765,098 | A | 6/1998 | Bella |
| 5,812,947 | A | 9/1998 | Dent |
| 5,832,379 | A | 11/1998 | Mallinckrodt |
| 5,835,857 | A | 11/1998 | Otten |
| 5,848,060 | A | 12/1998 | Dent |
| 5,850,608 | A | 12/1998 | Faruque |
| 5,852,721 | A | 12/1998 | Dillon et al. |
| 5,878,329 | A | 3/1999 | Mallinckrodt |
| 5,884,142 | A | 3/1999 | Wiedeman et al. |
| 5,907,541 | A | 5/1999 | Fairholm et al. |
| 5,926,758 | A * | 7/1999 | Grybos et al. ................ 455/429 |
| 5,937,332 | A | 8/1999 | Karabinis |
| 5,940,753 | A | 8/1999 | Mallinckrodt |
| 5,951,709 | A * | 9/1999 | Tanaka ......................... 714/755 |
| 5,960,349 | A | 9/1999 | Chheda et al. |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,091,936 | A | 7/2000 | Chennakeshu et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,128,469 | A * | 10/2000 | Zenick et al. ................ 455/12.1 |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,124 | B1 | 5/2001 | Wiedeman et al. |
| 6,243,587 | B1 | 6/2001 | Dent et al. |
| 6,253,080 | B1 | 6/2001 | Wiedeman et al. |
| 6,256,497 | B1 | 7/2001 | Chambers |
| 6,289,221 | B1 | 9/2001 | Ritter |
| 6,311,074 | B1 | 10/2001 | Lüders |
| 6,317,412 | B1 | 11/2001 | Natali et al. |
| 6,324,405 | B1 | 11/2001 | Young et al. |
| 6,339,707 | B1 | 1/2002 | Wainfan et al. |
| 6,339,708 | B1 | 1/2002 | Wang |
| 6,389,336 | B2 * | 5/2002 | Cellier ........................... 701/13 |
| 6,396,819 | B1 * | 5/2002 | Fleeter et al. .................. 370/320 |
| 6,405,044 | B1 | 6/2002 | Smith et al. |
| 6,418,147 | B1 | 7/2002 | Wiedeman |
| 6,449,461 | B1 | 9/2002 | Otten |
| 6,522,865 | B1 | 2/2003 | Otten |
| 6,560,459 | B1 | 5/2003 | Wong |
| 6,628,919 | B1 * | 9/2003 | Curello et al. ............... 455/12.1 |
| 6,678,520 | B1 * | 1/2004 | Wang ........................... 455/428 |
| 6,684,057 | B2 | 1/2004 | Karabinis |
| 6,735,437 | B2 | 5/2004 | Mayfield et al. |
| 6,775,251 | B1 | 8/2004 | Wiedeman et al. |
| 6,785,543 | B2 | 8/2004 | Karabinis |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,937,857 | B2 | 8/2005 | Karabinis |
| 6,975,837 | B1 | 12/2005 | Santoru |
| 6,999,720 | B2 | 2/2006 | Karabinis |
| 7,006,789 | B2 | 2/2006 | Karabinis et al. |
| 7,031,702 | B2 | 4/2006 | Karabinis et al. |
| 7,039,400 | B2 | 5/2006 | Karabinis et al. |
| 7,062,267 | B2 | 6/2006 | Karabinis |
| 7,092,708 | B2 | 8/2006 | Karabinis |
| 7,113,743 | B2 | 9/2006 | Karabinis |
| 7,113,778 | B2 | 9/2006 | Karabinis |
| 7,174,127 | B2 | 2/2007 | Otten et al. |
| 7,181,161 | B2 | 2/2007 | Karabinis |
| 2001/0046866 | A1 | 11/2001 | Wang |
| 2002/0077099 | A1 * | 6/2002 | LaPrade ........................ 455/430 |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2003/0003815 | A1 | 1/2003 | Yamada |
| 2003/0078040 | A1 * | 4/2003 | Mayfield et al. .............. 455/427 |
| 2003/0149986 | A1 | 8/2003 | Mayfield et al. |
| 2003/0153308 | A1 | 8/2003 | Karabinis |
| 2004/0072539 | A1 | 4/2004 | Monte et al. |
| 2004/0102156 | A1 * | 5/2004 | Loner ........................... 455/12.1 |
| 2004/0121727 | A1 * | 6/2004 | Karabinis ..................... 455/11.1 |
| 2004/0142660 | A1 * | 7/2004 | Churan ......................... 455/12.1 |
| 2004/0192200 | A1 | 9/2004 | Karabinis |
| 2004/0192395 | A1 | 9/2004 | Karabinis |
| 2004/0203393 | A1 | 10/2004 | Chen |
| 2004/0240525 | A1 | 12/2004 | Karabinis et al. |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0064813 | A1 * | 3/2005 | Karabinis ..................... 455/13.2 |
| 2005/0079816 | A1 | 4/2005 | Karabinis et al. |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0260947 | A1 | 11/2005 | Karabinis et al. |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0282542 | A1 | 12/2005 | Karabinis |
| 2005/0288011 | A1 | 12/2005 | Dutta |
| 2006/0040613 | A1 | 2/2006 | Karabinis et al. |
| 2006/0040657 | A1 | 2/2006 | Karabinis et al. |
| 2006/0040659 | A1 | 2/2006 | Karabinis |
| 2006/0094352 | A1 | 5/2006 | Karabinis |
| 2006/0094420 | A1 | 5/2006 | Karabinis |
| 2006/0105707 | A1 | 5/2006 | Karabinis |
| 2006/0111041 | A1 | 5/2006 | Karabinis |
| 2006/0111056 | A1 | 5/2006 | Dutta |
| 2006/0135058 | A1 | 6/2006 | Karabinis |
| 2006/0135060 | A1 | 6/2006 | Karabinis |
| 2006/0135070 | A1 | 6/2006 | Karabinis |
| 2006/0165120 | A1 | 7/2006 | Karabinis |
| 2006/0189274 | A1 | 8/2006 | Karabinis |
| 2006/0189275 | A1 | 8/2006 | Karabinis |
| 2006/0189309 | A1 | 8/2006 | Good et al. |
| 2006/0194576 | A1 | 8/2006 | Karabinis et al. |
| 2006/0205346 | A1 | 9/2006 | Evans et al. |
| 2006/0205347 | A1 | 9/2006 | Karabinis |
| 2006/0205367 | A1 | 9/2006 | Karabinis |
| 2006/0211371 | A1 | 9/2006 | Karabinis et al. |
| 2006/0211419 | A1 | 9/2006 | Karabinis |
| 2006/0211452 | A1 | 9/2006 | Karabinis |
| 2006/0217070 | A1 | 9/2006 | Karabinis |

(56) References Cited

U.S. PATENT DOCUMENTS

| | | |
|---|---|---|
| 2006/0232465 A1 | 10/2006 | Levin et al. |
| 2006/0233147 A1 | 10/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0026867 A1 | 2/2007 | Karabinis |
| 2007/0184778 A1* | 8/2007 | Mechaley ............... 455/12.1 |

FOREIGN PATENT DOCUMENTS

| | | |
|---|---|---|
| EP | 0 717 577 A2 | 6/1996 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 0 926 844 A2 | 6/1999 |
| EP | 0 926 844 A3 | 6/1999 |
| EP | 1 047 278 A2 | 10/2000 |
| EP | 1 047 278 A3 | 10/2000 |
| EP | 1 059 826 A1 | 12/2000 |
| EP | 1 193 989 A1 | 4/2002 |
| EP | 1 565 017 A2 | 8/2005 |
| WO | 01/54314 A1 | 7/2001 |
| WO | WO 02/03722 A1 | 1/2002 |

OTHER PUBLICATIONS

Qiu et al. "Dynamic Resource Allocation with Interference Avoidance for Fixed Wireless Systems" *IEEE International Symposium on Personal, Indoor and Mobile Radio Communications* 3:1433-1437 (1998).

Wang et al. "Interference Analysis of TDD-CDMA Systems with Directional Antennas" *IEEE 58$^{th}$ Vehicular Technology Conference*, 2:1369-1373 (2003).

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", Wireless Networks, Vo. 4, 1998, pp. 189-198.

International Preliminary Report on Patentability, PCT/US2007/006969, Sep. 11, 2008.

Invitation to Pay Additional Fees with Partial International Search, PCT/US2007/006969, Nov. 15, 2007.

\* cited by examiner

SYSTEMS AND METHODS FOR CONTROLLING BASE STATION SECTORS TO REDUCE POTENTIAL INTERFERENCE WITH LOW ELEVATION SATELLITES

CROSS-REFERENCE TO RELATED APPLICATION

This application claims the benefit of Provisional Application No. 60/744,777, filed Apr. 13, 2006, entitled Systems and Methods for Controlling Base Station Sectors to Reduce Potential Interference With Low Elevation Satellites, assigned to the assignee of the present invention, the disclosure of which is hereby incorporated herein by reference in its entirety as if set forth fully herein.

FIELD OF THE INVENTION

This invention relates to wireless communications systems, methods and components thereof and more particularly to satellite and terrestrial wireless communications systems, methods and components thereof.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal," a "mobile terminal," a "user device," a "wireless transmitter," a "wireless receiver," a "transceiver" or simply as a "terminal". As used herein, the term(s) "radioterminal," "radiotelephone," "mobile terminal," "user device," "wireless transmitter," "wireless receiver," "transceiver" and/or "terminal" also include(s) any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some frequencies of a satellite frequency band and using substantially the same air interface for both terrestrial and satellite communications may be more cost effective and/or aesthetically appealing compared to other alternatives. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. No. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein.

Many of the above-cited patents and publications can reduce or eliminate intra-system interference that is caused by terrestrial use and/or reuse of satellite frequencies by an ancillary terrestrial network. However, inter-system interference also can be caused by terrestrial use and/or reuse of satellite frequencies by an ancillary terrestrial network and/or radioterminals communicating therewith.

SUMMARY OF THE INVENTION

Interference between satellite radioterminal communications systems may be reduced, according to some embodiments of the present invention, by transmitting and receiving satellite uplink frequencies in a Time Division Duplex (TDD) mode by a wireless base station in a first sector thereof, while simultaneously refraining from transmitting and receiving satellite uplink frequencies in the TDD mode by the wireless base station in a second sector thereof that points to a low elevation angle satellite. In other embodiments, satellite uplink frequencies may be transmitted and received in the TDD mode by a satellite that communicates with radioterminals in the second sector.

Many embodiments of simultaneously refraining from transmitting and receiving satellite uplink frequencies in the TDD mode by the wireless base station in the second sector thereof, may be provided according to various embodiments of the present invention. For example, in some embodiments, the wireless base station refrains from transmitting and receiving satellite uplink frequencies in the TDD mode and in a non-TDD mode in the second sector thereof. In other embodiments, satellite downlink frequencies are transmitted in a non-TDD mode by the wireless base station in the second sector thereof. In still other embodiments, satellite downlink frequencies are transmitted and received in the TDD mode by the wireless base station in the second sector thereof.

In still other embodiments, the wireless base station simultaneously refrains from transmitting and receiving satellite uplink frequencies in the TDD mode in a second sector thereof that points to a low elevation angle satellite, and/or that has a direct line-of-sight path to the low elevation satellite. In other embodiments, the sector points to the low elevation angle satellite and is also located near a coastline.

Other embodiments of the invention provide sectorization methods for a wireless base station. These sectorization methods may comprise transmitting and receiving uplink frequencies in a TDD mode by the wireless base station in a first sector thereof, while simultaneously refraining from transmitting and receiving uplink frequencies in the TDD mode by the wireless base station in a second sector thereof. Simultaneously refraining from transmitting and receiving uplink frequencies in the TDD mode in the second sector may be provided by refraining from transmitting or receiving uplink frequencies in the TDD mode and in a non-TDD mode in the second sector, by transmitting downlink frequencies in a non-TDD mode in the second sector and/or by transmitting and receiving downlink frequencies in the TDD mode in the second sector.

Still other embodiments of the present invention provide sectorization methods for a wireless base station that comprise simultaneously transmitting or receiving wireless communications in different modes in different sectors of the wireless base station. In some embodiments, the different modes may comprise a TDD mode and a non-TDD mode. In other embodiments, the different modes may comprise different air interfaces.

Embodiments of the invention have been described above in connection with methods of reducing interference between satellite radioterminal communication systems and sectorization methods for wireless base stations. However, other embodiments provide analogous systems for reducing wireless interference between satellite radioterminal communication systems and analogous sectorization systems for a wireless communications system. In these systems, a wireless base station may be configured according to any of the above-described embodiments. Moreover, still other embodiments of the present invention provide a wireless base station itself that is configured according to any of the above-described embodiments.

DETAILED DESCRIPTION

Figure 1A:
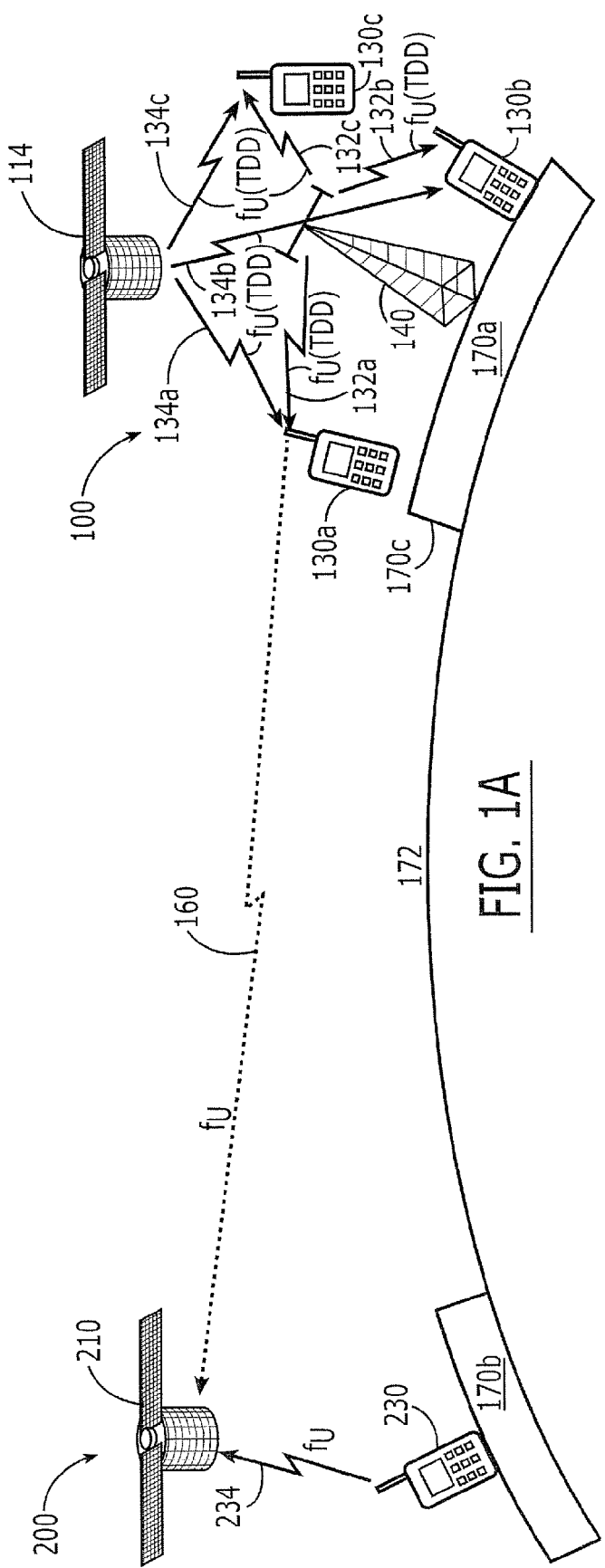
FIG. 1A is a schematic diagram illustrating potential interference that may be caused by a first satellite radioterminal communications system to a second satellite radioterminal communications system.

Specific embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

Embodiments of the present invention will be described herein in connection with potential interference that may be caused by components of a first wireless communications system (e.g., a first satellite radioterminal communications system) to components of a first and/or a second wireless communications system (e.g., a first and/or a second satellite radioterminal communications system), and solutions to reduce or eliminate this potential interference. In some embodiments, the first satellite radioterminal communications system may be a satellite radioterminal communications system that is operated by Mobile Satellite Ventures, LP ("MSV") and the second satellite radioterminal communications system may be an Asia Cellular Satellite ("ACeS") and/or an Inmarsat system. However, other first and second satellite radioterminal communications systems may be provided according to other embodiments of the present invention. It will be understood that two or more embodiments of the present invention as presented herein may be combined in whole or in part to form one or more additional embodiments.

As used herein, the term "Time Division Duplex" means that a given frequency is used for uplink and downlink communications at different times. Moreover, as used herein, "uplink frequency" and "downlink frequency" define a frequency in a frequency band that is assigned for uplink or downlink communications, respectively, by a regulatory authority.

FIG. 1A is a schematic diagram illustrating potential interference that may be caused by a first satellite radioterminal communications system to a second satellite radioterminal communications system. As shown in FIG. 1A, the first satellite radioterminal communications system 100 includes a first space-based component, such as one or more first satellites 114 and one or more ancillary terrestrial components (ATC) 140 (also referred to herein as an "ATC base station", a "wireless base station" or a "base station") that serve a plurality of first radioterminals 130a, 130b, 130c. As shown in FIG. 1A, satellite uplink frequencies $f_U$ are used to transmit communications to the first radioterminals 130a, 130b, 130c by the ancillary terrestrial component 140 and/or by the first satellite 114 when the system operates in Time Division Duplex (TDD) mode. In some embodiments, the first satellite radioterminal communications system 100 may serve a first landmass 170a. In some embodiments, the first satellite radioterminal communications system 100 may be embodied as a system that uses and/or reuses satellite frequencies terrestrially via an ancillary terrestrial network comprising one or more terrestrial components 140, and which may be embodied by an MSV system. It will be understood that more than one first satellite 114 may be provided and, typically, large numbers of ancillary terrestrial components 140 and first radioterminals 130 may be provided.

Figure 1B:
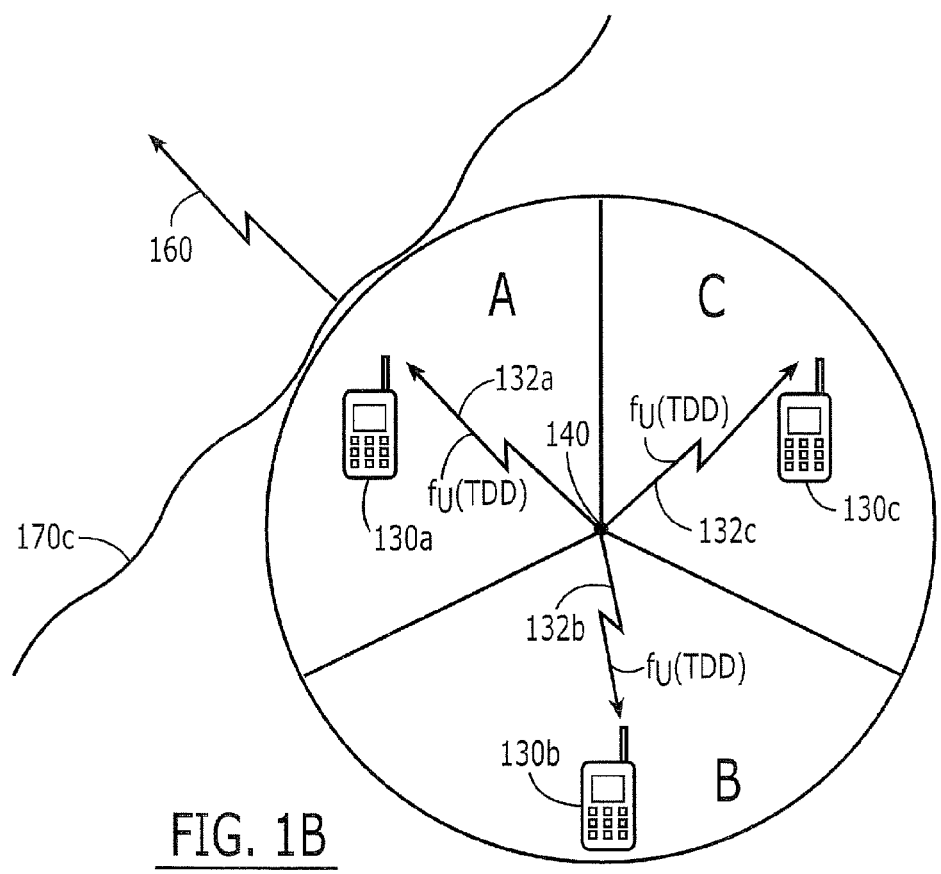
FIG. 1B is a plan view of sectors of a given ancillary terrestrial component of FIG. 1A.

In particular, FIG. 1A illustrates three first radioterminals 130a, 130b, 130c, a respective one of which may be located in a respective one of three (or more) sectors of an ancillary terrestrial component 140. Specifically, radiation by an ancillary terrestrial component 140 may be divided into sectors, such as three sectors of 120° each, to allow greater frequency reuse, in a manner similar to the sectorization of conventional terrestrial base stations of conventional cellular/PCS systems. FIG. 1B is a plan view of sectors A, B and C for a given ancillary terrestrial component 140. The TDD transmissions by the ancillary terrestrial component 140 to a respective radioterminal 130a, 130b, 130c in a respective sector A, B, C of the ancillary terrestrial component 140, are indicated by the respective transmission links 132a, 132b, 132c. Moreover, the satellite 114 may also communicate with the plurality of first radioterminals 130a, 130b, 130c using one or more antenna patterns (spot beams), such as antenna patterns (spot beams) 134a, 134b, 134c, in TDD mode.

Still referring to FIG. 1A, a second satellite radioterminal communications system 200 may include a space-based component, such as one or more second satellites 210, that communicate with at least one second radioterminal 230, using at least some of the same band of satellite frequencies $f_U$, over a satellite uplink 234. The second radioterminal(s) 230 may operate on a second landmass 170b that is widely spaced apart from the first landmass 170a, for example by an ocean 172. The second satellite system 200 may be embodied, for example, in an ACeS or Inmarsat communications network that serves Africa, Europe and/or parts of Asia. It will be understood by those having skill in the art that more than one second satellite 210 may be provided and, a large number of second radioterminals 230 may be provided.

As also shown in FIG. 1A, the ATC base station 140 operating in TDD mode using frequencies of a satellite uplink range $f_U$, such as the L-band satellite uplink range of 1625.5-1660.5 MHz, may cause interference to a receiver of a second satellite 210 that receives communications from the second radiotelephones 230 over an uplink 234 that uses frequencies of the satellite uplink range $f_U$. This potential interference path is illustrated as 160 in FIGS. 1A and 1B. Specifically, as shown in FIG. 1A, if the elevation angle between the ATC base station 140 and the second satellite 210 is small ("low-elevation angle satellite") and a Line-Of-Sight (LOS) path 160 exists between the ATC base station 140 and the second satellite 210, a radiation pattern of the ATC base station 140 may cause interference to a receiver of the second satellite 210.

More specifically, the low-elevation angle of the second satellite 210 may be caused due to the second satellite 210 serving a widely separated landmass. For example, with the MSV system 100 serving North America, and the ACeS system 200 serving parts of Asia, elevation angles of, for example, between 1° and 2° may be created for the ACeS satellite 210 relative to the MSV ATC base station 140. Moreover, ATC base stations 140 that are near the coastline 170c of the first landmass 170a that faces the second landmass 170b may experience very low blockage by buildings, mountains and/or other geographic features. Accordingly, there exists a possibility of creating an interference path 160 from the ATC base station 140 adjacent the coastline 170c to the low elevation angle second satellite 210 serving a landmass 170b across an ocean 172. Other potential interference scenarios also may be envisioned.

Figure 2A:
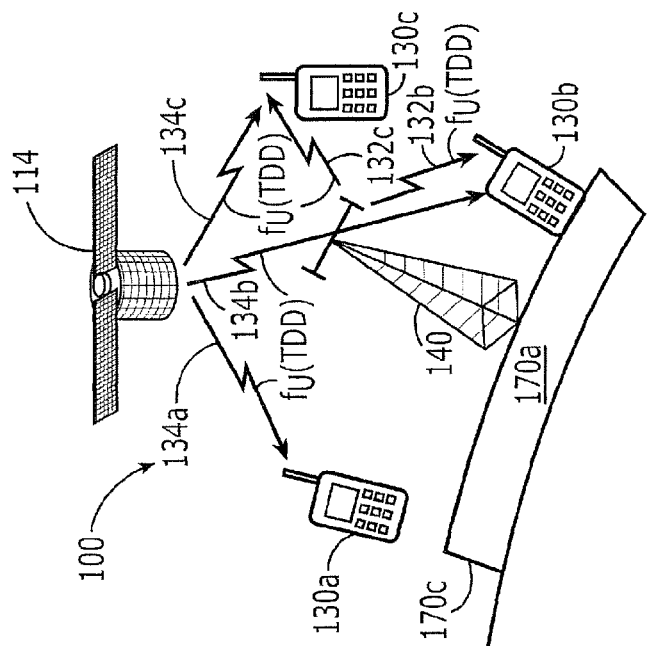
FIG. 2A is a schematic diagram illustrating reduction of potential interference that may be caused by a first satellite radioterminal communications system to a second satellite radioterminal communications system, according to some embodiments of the invention.
Figure 2A:
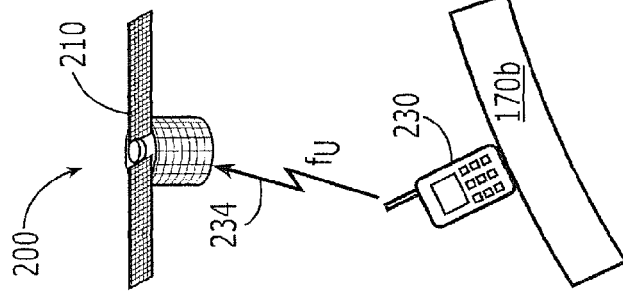
Figure 2B:
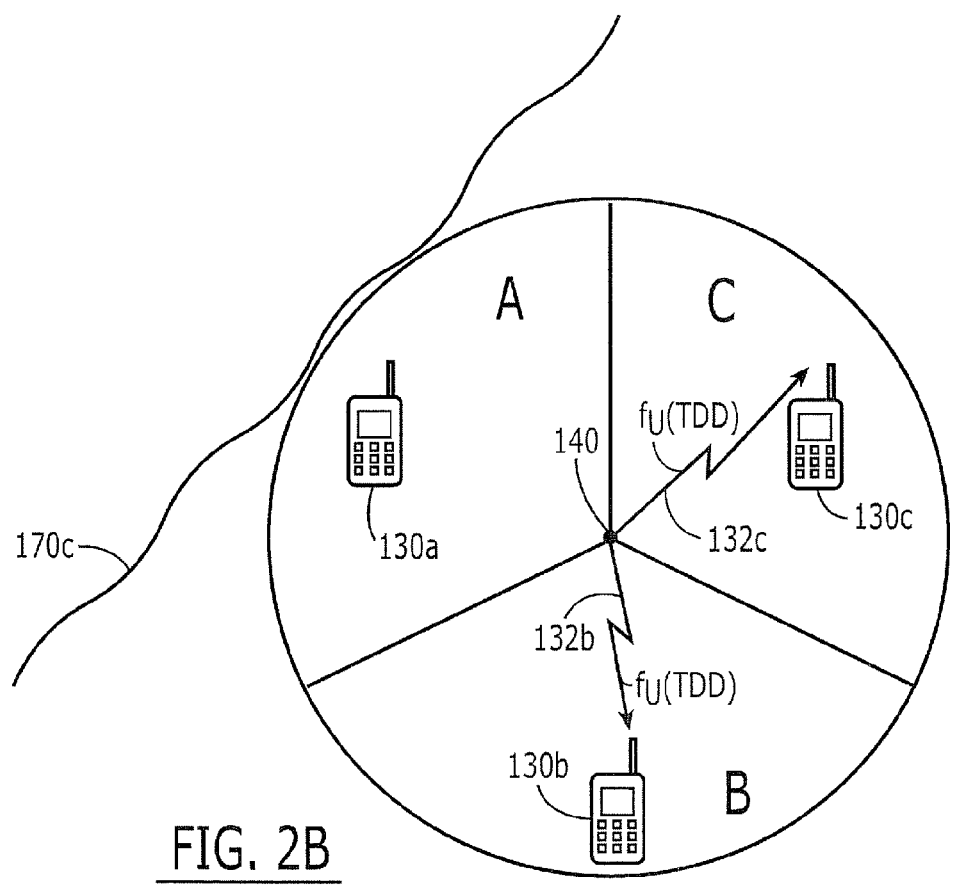
FIG. 2B is a plan view of sectors of a given ancillary terrestrial component of FIG. 2A, according to some embodiments of the present invention.
Figure 3A:
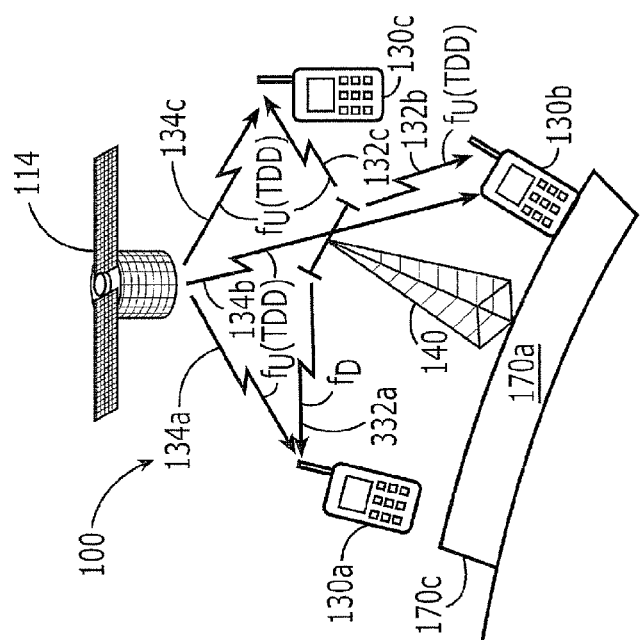
FIG. 3A is a schematic diagram illustrating reduction of potential interference that may be caused by a first satellite radioterminal communications system to a second satellite radioterminal communications system, according to other embodiments of the invention.
Figure 3A:
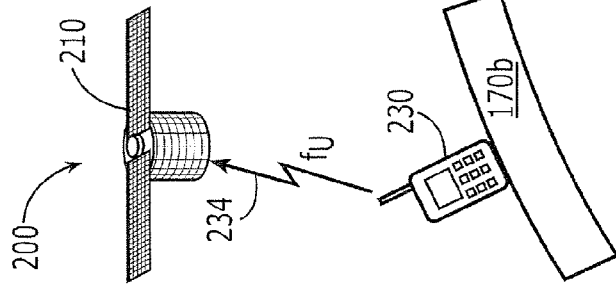
Figure 3B:
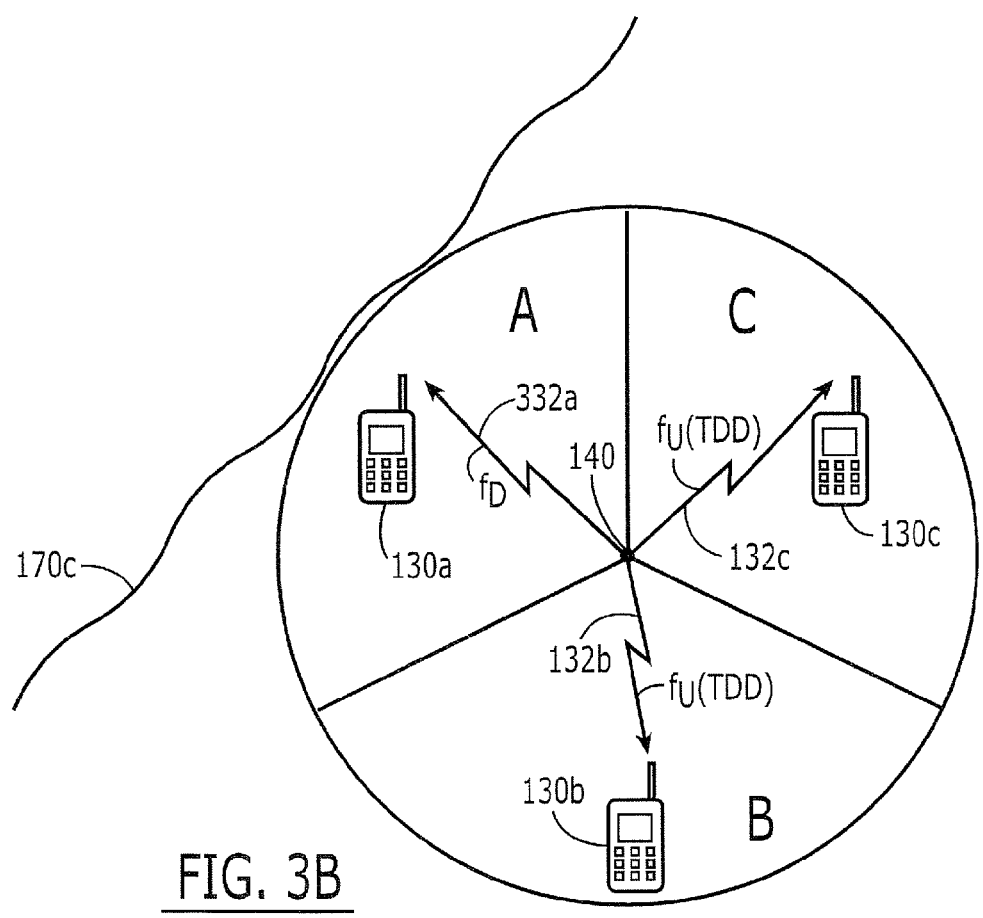
FIG. 3B is a plan view of sectors of a given ancillary terrestrial component of FIG. 3A, according to other embodiments of the present invention.
Figure 4A:
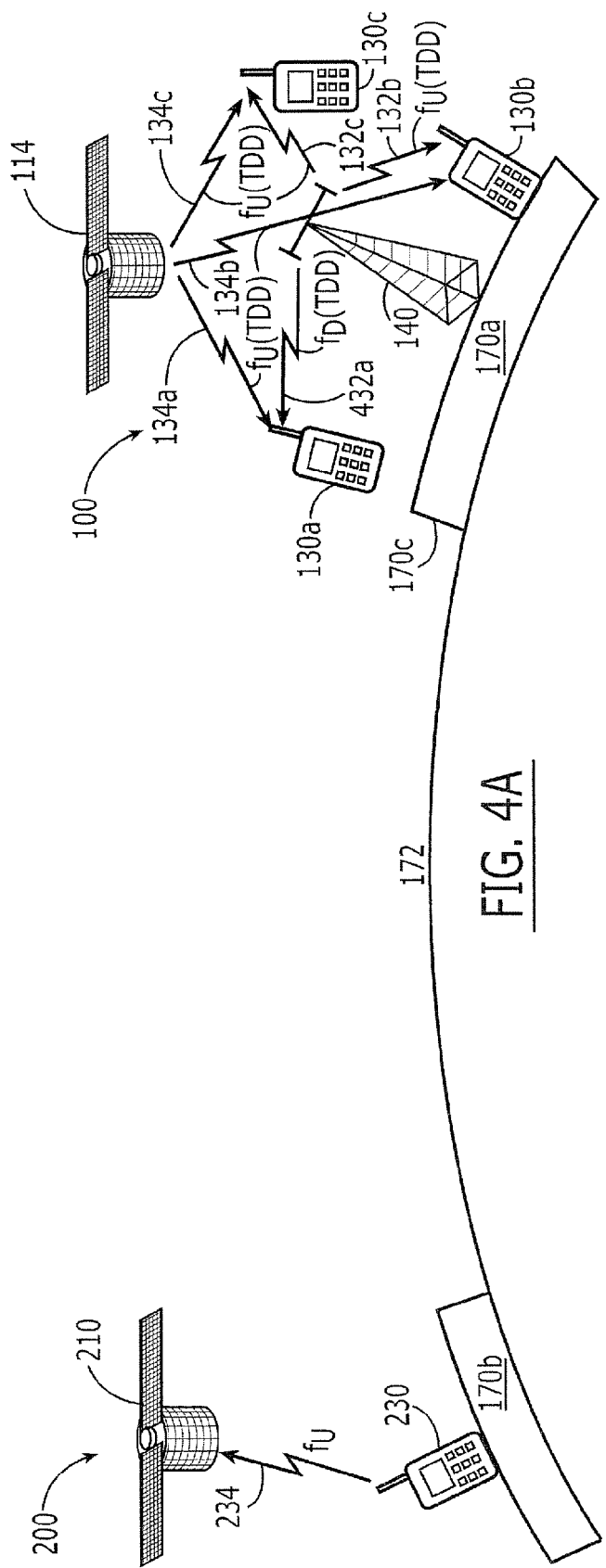
FIG. 4A is a schematic diagram illustrating reduction of potential interference that may be caused by a first satellite radioterminal communications system to a second satellite radioterminal communications system, according to still other embodiments of the invention.
Figure 4B:
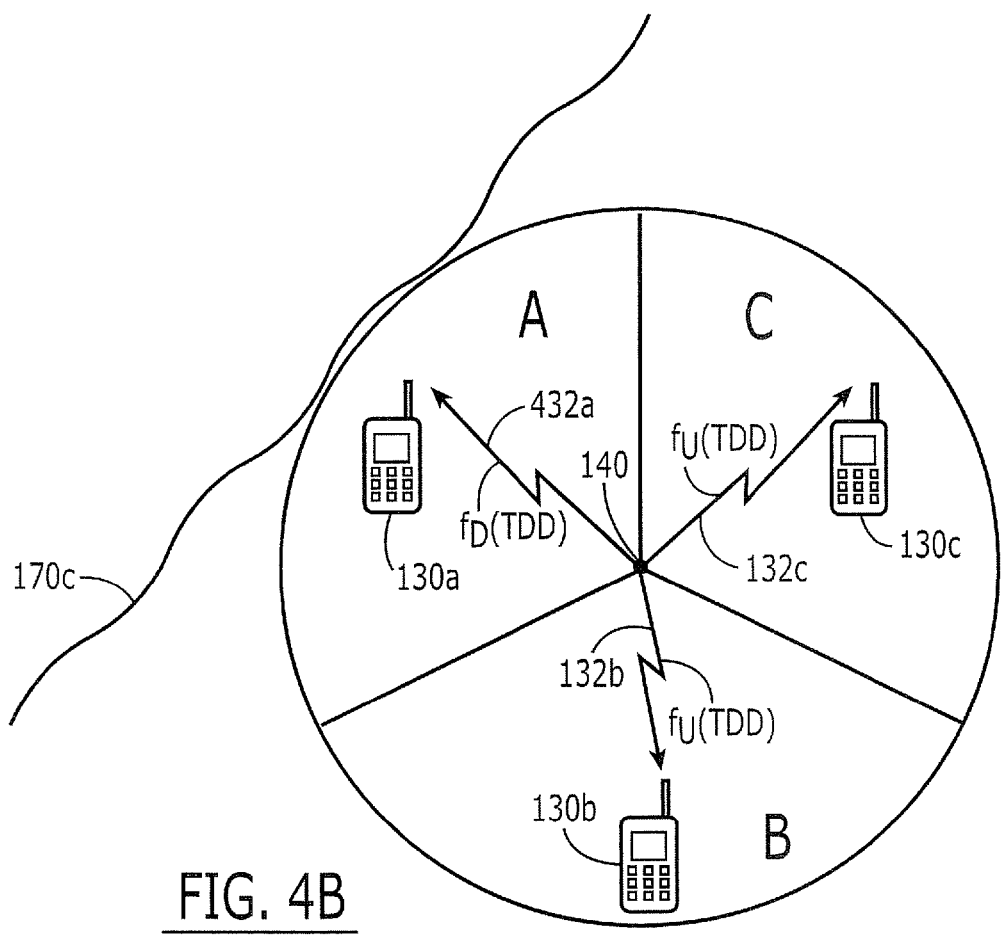
FIG. 4B is a plan view of sectors of a given ancillary terrestrial component of FIG. 4A, according to still other embodiments of the present invention.

Some embodiments of the present invention can reduce or eliminate this potential interference path 160 by refraining from radiating at least some frequencies of the satellite uplink range $f_U$, by one or more sectors of one or more ATC base stations 140 that is/are oriented substantially in the direction of the second satellite 210. For example, as shown in FIGS. 2A/2B, the potential interference path 160 of FIGS. 1A/1B may be reduced or eliminated by refraining from radiating by the base station 140 in a first sector A thereof over TDD link 132a using one or more uplink frequencies $f_U$. As shown in FIG. 2A, in some embodiments, communications with first radioterminal 130a in this first sector A may be provided via the satellite link 134a (in TDD or non-TDD mode). Alternatively, as shown in FIGS. 3A/3B, communications in this sector A may be provided via a non-TDD link 332a using a satellite downlink frequency $f_D$. In yet other embodiments, as shown in FIGS. 4A/4B, the given sector A may continue to operate in TDD mode, but using only satellite downlink frequencies $f_D$, as shown by link 432a of FIGS. 4A/4B.

Some embodiments of the invention may arise from recognition that an ancillary terrestrial component 140 operating in TDD mode and transmitting using frequencies of the satellite uplink frequency range $f_U$ may also be using frequencies of the satellite downlink range $f_D$, such as, for example, an L-band satellite downlink range of 1525-1559 MHz, and/or any other range of frequencies other than the satellite uplink range. These downlink frequencies $f_D$ and/or other range of frequencies may be used in a given sector to reduce or eliminate inter-system interference. It will be understood by those having skill in the art that the potential interference 160 may only occur when the ATC 140 is operating in TDD mode (or in reverse-band mode), such that the ATC 140 transmits to a radioterminal 130 using satellite uplink frequencies $f_U$ that may also be received by the second satellite 210. Since the orientation of the second satellite 210 relative to the ATC base station 140 may be known and/or may be determined by, for example, knowing the location or approximate location of the second satellite 210 at a geostationary arc, the sector A, B and/or C of the ATC base station 140 that points substantially towards the second satellite 210 may be modified as was described above, so that the sector that is in substantially a line-of-sight path 160 with the second satellite 200 can refrain from using one or more of the satellite uplink frequencies $f_U$. Interference with the second satellite radioterminal communications system 200 may thereby be reduced or eliminated.

Still other embodiments of the present invention may provide different modes of operation in different sectors of a wireless base station for any reason. The different modes of operations may include a TDD and a non-TDD mode and/or different air interfaces, but excludes the use of different frequency sets in different sectors, because different frequency sets are conventionally used in different sectors. Accordingly, in some embodiments, a wireless base station simultaneously transmits or receives wireless communications in different modes in different sectors of the wireless base station.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of reducing interference between satellite radioterminal communications systems comprising:

transmitting and receiving satellite uplink frequencies in a Time Division Duplex (TDD) mode by a wireless base station in a first sector thereof while simultaneously retraining from transmitting and receiving satellite uplink frequencies in the TDD mode by the wireless base station in a second sector thereof that points to a low elevation angle satellite.

2. A method according to claim 1 further comprising transmitting and receiving satellite uplink frequencies in the TDD mode by a satellite that communicates with radioterminals in the second sector.

3. A method according to claim 1 further comprising refraining from transmitting and receiving satellite uplink frequencies in the TDD mode and in a non-TDD mode by the wireless base station in the second sector thereof.

4. A method according to claim 1 further comprising transmitting satellite downlink frequencies in a non-TDD mode by the wireless base station in the second sector thereof.

5. A method according to claim 1 further comprising transmitting and receiving satellite downlink frequencies in the TDD mode by the wireless base station in the second sector thereof.

6. A method according to claim 1 wherein simultaneously refraining from transmitting and receiving comprises simultaneously refraining from transmitting and receiving satellite uplink frequencies in the TDD mode by the wireless base station in a second sector thereof that points to a low elevation angle satellite and has a direct line-of sight path to the low elevation satellite.

7. A method according to claim 1 wherein simultaneously refraining from transmitting and receiving comprises simultaneously refraining from transmitting and receiving satellite uplink frequencies in the TDD mode by the wireless base station in a second sector thereof that points to a low elevation angle satellite and is located near a coastline.

8. A system for reducing interference between satellite radioterminal communications systems comprising:
a wireless base station that is configured to transmit and receive satellite uplink frequencies in a Time Division Duplex (TDD) mode in a first sector thereof while simultaneously refraining from transmitting and receiving satellite uplink frequencies in the TDD mode in a second sector thereof that points to a low elevation angle satellite.

9. A system according to claim 8 further comprising a satellite that is configured to transmit and receive satellite uplink frequencies in the TDD mode to communicate with radioterminals in the second sector.

10. A system according to claim 8 wherein the wireless base station is further configured to refrain from transmitting and receiving satellite uplink frequencies in the TDD mode and in a non-TDD mode in the second sector thereof.

11. A system according to claim 8 wherein the wireless base station is further configured to refrain from transmitting satellite downlink frequencies in a non-TDD mode in the second sector thereof.

12. A system according to claim 8 wherein the wireless base station is further configured to transmit and receive satellite downlink frequencies in the TDD mode in the second sector thereof.

13. A system according to claim 8 wherein the wireless base station is configured to simultaneously refrain from transmitting and receiving by simultaneously refraining from transmitting and receiving satellite uplink frequencies in the TDD mode in a second sector thereof that points to a low elevation angle satellite and has a direct line-of sight path to the low elevation satellite.

14. A system according to claim 8 wherein the wireless base station is configured to simultaneously refrain from transmitting and receiving by simultaneously refraining from transmitting and receiving satellite uplink frequencies in the TDD mode in a second sector thereof that points to a low elevation angle satellite and is located near a coastline.

* * * * *

UNITED STATES PATENT AND TRADEMARK OFFICE
CERTIFICATE OF CORRECTION

PATENT NO. : 8,923,850 B2
APPLICATION NO. : 11/682683
DATED : December 30, 2014
INVENTOR(S) : Peter D. Karabinis It is certified that error appears in the above-identified patent and that said Letters Patent is hereby corrected as shown below:

In the Claims:
Column 9, Claim 1, Line 1: Please correct "retraining from"
                        to read -- refraining from --

Signed and Sealed this
Twenty-eighth Day of April, 2015

Michelle K. Lee
*Director of the United States Patent and Trademark Office*